United States Patent
Laverty

(10) Patent No.: US 10,964,222 B2
(45) Date of Patent: Mar. 30, 2021

(54) COGNITIVE ASSIMILATION AND SITUATIONAL RECOGNITION TRAINING SYSTEM AND METHOD

(71) Applicant: Michael J. Laverty, Newbury Park, CA (US)

(72) Inventor: Michael J. Laverty, Newbury Park, CA (US)

(*) Notice: Subject to any disclaimer, the term of this patent is extended or adjusted under 35 U.S.C. 154(b) by 244 days.

(21) Appl. No.: 15/871,695

(22) Filed: Jan. 15, 2018

(65) Prior Publication Data

US 2018/0204476 A1     Jul. 19, 2018

Related U.S. Application Data

(60) Provisional application No. 62/446,736, filed on Jan. 16, 2017.

(51) Int. Cl.
| | |
|---|---|
| *G09B 5/06* | (2006.01) |
| *G09B 7/06* | (2006.01) |
| *G06F 11/34* | (2006.01) |
| *G09B 9/00* | (2006.01) |
| *G09B 7/08* | (2006.01) |

(52) U.S. Cl.
CPC .......... *G09B 5/067* (2013.01); *G06F 11/3438* (2013.01); *G09B 5/06* (2013.01); *G09B 5/065* (2013.01); *G09B 7/06* (2013.01); *G09B 7/08* (2013.01); *G09B 9/00* (2013.01)

(58) Field of Classification Search
None
See application file for complete search history.

(56) References Cited

U.S. PATENT DOCUMENTS

| | | | | |
|---|---|---|---|---|
| 2004/0152055 A1* | 8/2004 | Gliessner | ................. | G09B 5/06 434/169 |
| 2006/0003300 A1* | 1/2006 | Davis | ................. | A63B 24/0003 434/247 |
| 2012/0046099 A1* | 2/2012 | Mraovic | ................. | A63F 13/80 463/30 |
| 2014/0087349 A1* | 3/2014 | Kitch | ....................... | G09B 5/06 434/308 |

(Continued)

*Primary Examiner* — Jason T Yen
(74) *Attorney, Agent, or Firm* — Lazaris IP

(57) ABSTRACT

A tool for cognitive assimilation and situational recognition training includes one or more modules for visualization and visual association, auditory association, textual association, subliminal imprinting, constructive repetition, summarization, and testing of content provided to learners. The tool enables material provided as training content to be visualized by a user, and applies subliminal imprinting techniques to reinforce the visualized training content. The visualized and subliminally imprinted training content is further reinforced with visual, auditory and textual associations to the training content, and by constructive repetition of training content for the user, together with the subliminal messaging and associations. The tool also provides material in a building block approach so that previously-learned material is additionally reinforced in subsequent introductions of additional content. Cognitive assimilation and situational recognition training is also presented to the user in a hosting platform that enables online access and mobile learning in a flexible e-learning environment.

15 Claims, 3 Drawing Sheets

(56) References Cited

U.S. PATENT DOCUMENTS

2015/0046822 A1* 2/2015 Kitch .................. G09B 5/02
                                                                                 715/721
2017/0178531 A1* 6/2017 Swank ................ G06F 21/31

* cited by examiner

COGNITIVE ASSIMILATION AND SITUATIONAL RECOGNITION TRAINING SYSTEM AND METHOD

CROSS-REFERENCE TO RELATED PATENT APPLICATION(S)

This patent application claims priority to U.S. provisional application 62/446,736, filed on Jan. 16, 2017, the contents of which are incorporated in their entirety herein. In accordance with 37 C.F.R. § 1.76, a claim of priority is included in an Application Data Sheet filed concurrently herewith.

FIELD OF THE INVENTION

The present invention relates to an approach for learning within an online, web-based training environment. Specifically, the present invention relates to a system and method for cognitive assimilation and situational recognition using one or more modular sections that promote visual cortex imprinting for repetitive content reinforcement.

BACKGROUND OF THE INVENTION

Conventional training for officiating in sporting contexts is generally inefficient as it pertains to learner retention, and is also insufficient from a methodology perspective, as it fails to adequately prepare the sports official for actual situations that occur on the field. Conventional training is based primarily on the "trial by fire"/"sink or swim" approach, which relies on actual game experience to achieve success. One problem with this methodology is the lengthy time period required to observe the numerous situations that lead to proficiency, and the repeated high probability of erroneous application of the rules and/or mechanics during that time. Additionally, these errors may become permanently ingrained in a negative manner.

This issue is also not limited to the world of sport. In any situation where training is needed, conventional techniques frequently rely on this existing approach. Some examples of other areas where this occurs include medicine, security, law enforcement, and military. While it is certainly the case that actual experience is invaluable, it remains that mistakes are frequently made, there is a long period of time needed to learn, and incorrect understandings of how to deal with situations may become erroneously associated with accuracy. Where this occurs in, for example, medical and security situations, extra time needed to train personnel to overcome these problems results at least in increased costs, and lives could be lost.

In the world of sports, existing approaches to training of referees and officials typically evolve at the professional level, and then percolate down to coaches at the lower amateur and/or youth levels. This has also been the case for approaches applied to the training of players, particularly in youth sports. One important component of these training approaches for players has been incorporating visualizations to help them think about what their bodies are supposed to do, and then see themselves executing accordingly. For the player, it may be this simple, but it is far more complicated for the umpire. In fact, all sports are far more complicated for the sports official than they are for the participant due to the varied number of situations that require officiating knowledge coupled with a decisive response. While athletes may know many of the rules, they lack the in-depth knowledge of the nuances of the game and the associated rule interpretations, let alone the proper mechanics that any sports official must know to adequately officiate the game.

Officiating has not kept pace from a training perspective that the sports themselves have. While there have been major advancements in training science for youth athletes, the officials themselves still train in a very old-fashioned manner that has not changed in decades. Meanwhile, the athletes are getting better and better, and the games are getting faster and faster, but officiating is not keeping pace.

Prospective officials in youth sports typically attend a 1- or 2-day mechanics clinic, followed by a few rules clinics, and then go out and officiate actual contests. There is typically no further training until the following season is about to begin. This, coupled with the lack of scientific advancement in training methods for sports officials generally, makes continued education challenging. What few resources are available are either completely textual with flat two-dimensional drawings, or disjointed and unorganized random videos or PowerPoint presentations that are not easy for the learner to follow.

Accordingly there is a need in the existing art for improved approaches to training officials in both youth and professional sports. There is also a need for improved approaches that incorporate technological tools such as online, web-based learning platforms.

BRIEF SUMMARY OF THE INVENTION

The present invention provides a tool for learning, using repetitive content reinforcement in an online environment. The tool is particularly useful for training individuals involved in sports refereeing and officiating, and may also be extended to other areas such as medical, law enforcement, security, and military training situations.

The present invention provides a method and system for teaching situational recognition and improving cognitive assimilation of such. The present invention is accessed through a specialized portal in this online environment. Each lesson represents a specific topic, and includes specialized video training segments that present the material in a manner that engages multiple sensory modalities as well as multiple neural pathways in the brain. Points of emphasis are provided in a format that provides longer sensory engagement times to further embed the content. The retention is further reinforced through the use of analytic testing, and adjusting the delivery of content in response to that analytic testing. Embedding occurs by leveraging three of the four encoding mechanisms of the brain—acoustic encoding, visual encoding and semantic encoding—which are maximized through the use of associative and mnemonic methods, and by stimulation of the "weapon focus effect" phenomenon. This process directly and positively impacts the learner's ability to perform "serial recall" efficiently for multiple given circumstances.

The present invention therefore provides an approach that advances upon existing systems and methods in a manner that holistically provides the learner with the ability to absorb material in digestible, "bite size" increments that are logically organized and build on each subsequent subset of learning material, to realize improvements in the realm of sport officiating, and in other training environment requiring extensive retention of material. This approach relates relevant topics from within each sport's set of rules into a systematic approach that improves and encourages cognitive assimilation, and reduces the learning curve for situational recognition, such as reading the field-of-play while in a contest is in progress.

Most people are visual learners over and above other forms of learning, as images stimulate the visual cortex directly and therefore have a more direct path into the mind's eye. The brain imprints images deeper than words that are read, because images are directly related to the "fight or flight" response mechanism in the brain. In order to help the brain to imprint messages deeper into the visual cortex, auditory and textual stimulus—as well as subliminal imprinting and constructive repetition—are added to the mix. Thus, a combinatorial approach to training of sports officials that utilizes multiple techniques together is much more successful. As noted above, the present invention provides this approach in a hosted online platform, so as to present the techniques described herein in a way that substantially improves how non-clinical training is delivered to sports officials. Instead of a few days of training each year, the official can now supplement clinic training with tools provided herein in a continuous, online, on-demand environment.

The present invention is therefore a system and method for cognitive assimilation and situational recognition in a web-based, online training environment. The system and method is provided in a tool that promotes repetitive content reinforcement using visual, auditory, visual cortex, building block, constructive repetition, stop-frame segmentation, and summary modules. The present invention includes, in one aspect thereof, training a recipient of information to remember content by visually presenting written information, presenting auditory information, presenting situational video content, isolating situational content in one or more building blocks, and repeating and summarizing the information presented. These modules may be broken down into manageable sections that cover specific situations, such as rules or mechanics, to allow the recipient to better retain the information, and enable identification and repetition of trouble areas.

In one exemplary embodiment, the present invention is a method for cognitive assimilation and situational recognition training, comprising, within a computing environment comprised of at least one computer processor, and at least one non-transitory computer-readable storage medium operably coupled to the at least one computer processor, the at least one computer processor operable to execute a plurality of program instructions to deliver a plurality of visual, auditory, and textual associations to training content for a learner within a hosted platform, by performing the steps of assembling the training content for distribution to the learner in a plurality of building blocks of lesson material, and applying one or more subliminal imprinting techniques to reinforce the visual, auditory, and textual associations to the training content on the learner, constructively repeating the visual, auditory, and textual associations of the training content for the learner, and applying a variable-length stop-frame segmentation of elements of the training content, combined with the visual, auditory, and textual associations to the training content, for long-term assimilation and retention of the training content by the learner, so that previously-learned material is additionally reinforced in subsequent introductions of additional material in the training content.

In another exemplary embodiment, the present invention is a cognitive assimilation and situational recognition training system, comprising a custom learning management tool within a computing environment comprised of at least one computer processor, and at least one non-transitory computer-readable storage medium operably coupled to the at least one computer processor, the at least one computer processor operable to execute a plurality of data processing modules that apply a building block approach for training content provided to a learner, the plurality of data processing modules including a training content visualization module configured to provide a plurality of images of training content to the learner, a correlation module configured to correlate the visualized and subliminally imprinted training content with one or more of visual, auditory and textual associations to the training content for the learner, a training content imprinting and reinforcement module configured to 1) apply one or more subliminal imprinting techniques to enhance the visualized training content on the learner, and 2) repeat the visual, auditory, and textual associations of the training content for the learner, a content adjustment module configured to apply a variable-length stop-frame segmentation of the training content, for long-term assimilation and retention of the training content by the learner, so that previously-learned material is additionally reinforced in subsequent introductions of additional material in the training content, and adjust the visual, auditory, and textual associations of the training content for the learner, and a hosting platform for enabling the learner to access the custom learning management tool.

It is therefore one objective of the present invention to provide a tool for training sports officials in an online environment. It is another objective of the present invention to provide a system and method of training sports officials using visual stimulation and techniques for subliminal imprinting, together with auditory association and constructive repetition, in a building-block approach organized in a web-based learning environment. It is a further objective of the present invention to provide a system and method of training in any field where situational recognition is beneficial.

Other objects, embodiments, features, and advantages of the present invention will become apparent from the following description of the embodiments, which illustrate, by way of example, principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a tool, workflow, and framework 100 for promoting cognitive assimilation and situational recognition of training content, in one or more systems and methods that are provided to learners within an online environment. The tool 100, which may also be referred to herein as the Cognitive Assimilation and Situational Recognition Training System approach (or, as the CASRTS™ approach for ease of reference) is a novel approach to learning that may be utilized in many different fields, for example for training of sports officials such as referees and umpires. In one aspect thereof, the present invention includes a customized learning management framework provided within multiple modules for visualization, subliminal imprinting, constructive repetition, stop-frame video segmentation, visual association, auditory association, textual association, summary, and testing of content provided to learners, and may include a hosting platform for enabling and working with such a tool. It is to be noted that the one or more applications, mobile or otherwise, for enabling and working with the present invention may also be incorporated. Such applications be accessed using any computer-based platform, such as for example on a desktop, laptop, or tablet computing device, or a mobile telephony device.

Figure 1:
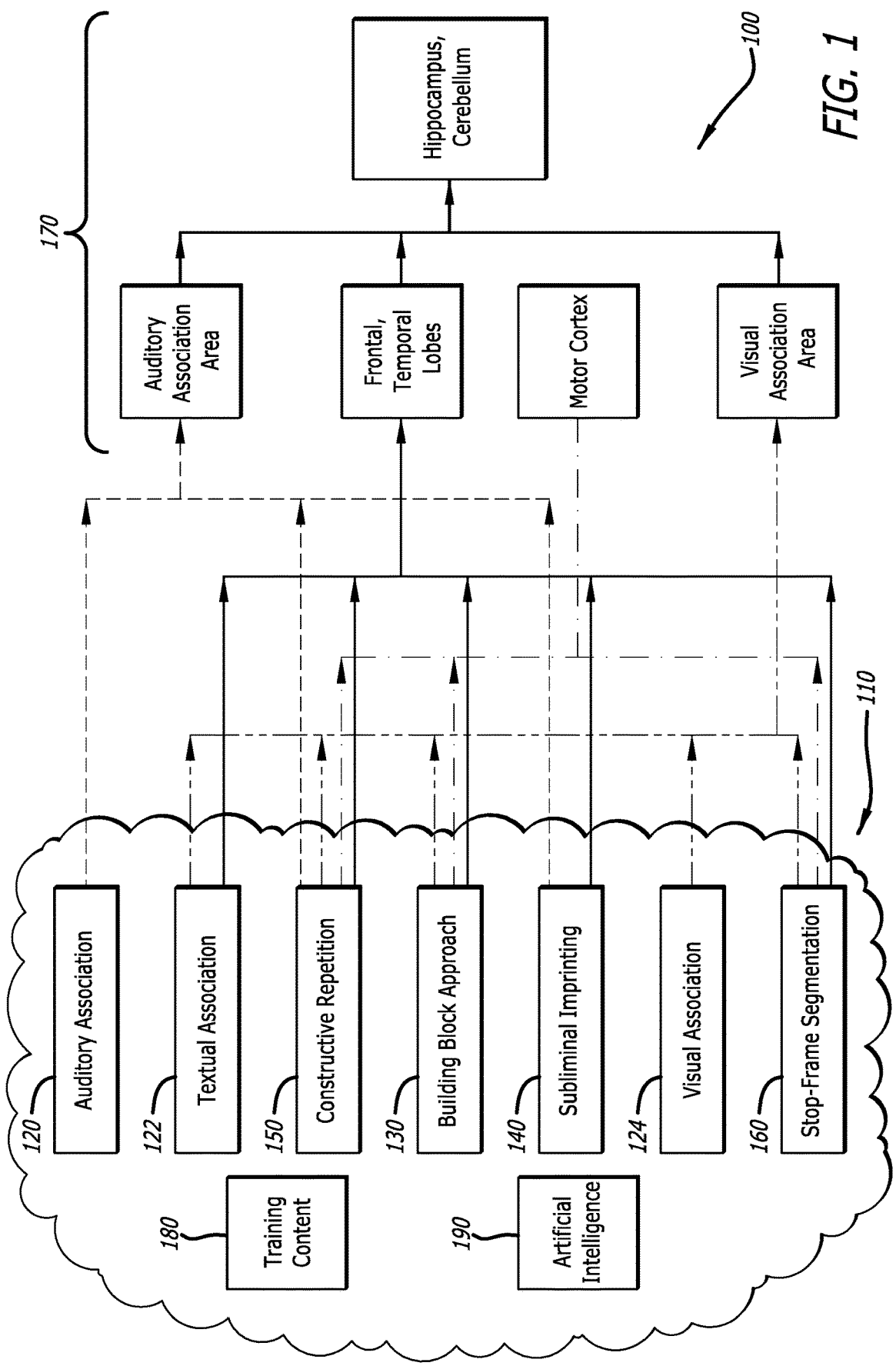
FIG. 1 is diagram of a tool for cognitive assimilation and situational recognition of training content, according to the present invention.

FIG. 1 is a diagram of the tool 100 for cognitive assimilation and situational recognition of training content 180, according to the present invention. The tool is performed within a computing environment 110 in which the systems and methods described herein are performed to present the training content 180 to be learned to learner or user 170 in the components described herein. The computing environment 110 may include one or more processors and a plurality of software and hardware components, and the one or more processors and plurality of software and hardware components may be configured to execute program instructions or routines to perform the functions performed within a plurality of data processing modules.

The tool 100 generates and utilizes auditory associations 120, textual associations 122, and visual associations 124, in a plurality of building blocks 130 of training content 180 that incorporate subliminal imprinting techniques 140, constructive repetition 150, and stop-frame video segmentation 160 to deliver content to learners 170. Together, these elements form the tool 100 for enabling the cognitive assimilation and situational recognition of the training content 180.

As noted below with respect to FIG. 2 and FIG. 3, the tool 100 may monitor the assimilation and retention of the training content 180 by the learner 170. This may be done, for example, by generating one or more tests or quizzes for the learner 170, in at least one instance of a building block 130. The tool 100 may incorporate one or more mathematical modeling functions to determine whether the learner 170 has sufficiently mastered the training content 180 present in a building block 130, and may adjust the visual, auditory, and textual associations (and other content, as well as the speed at which it is delivered) based on the assimilation and retention of the training content 180 by the learner 170.

The tool 100 may also incorporate one or more artificial intelligence and machine learning layers 190 that apply these mathematical modeling functions and other analytical techniques to further understand whether a learner 170 is assimilating and retaining training content 180 in a satisfactory manner. This is done by attempting to characterize the learner's responses to lesson material in building blocks 130 (and the auditory associations 120, textual associations 122, and visual associations 124), and observations developed from the learner's responses and progress.

The present invention may also utilize hierarchical and iterative training of machine learning algorithms to improve predictions based on these observations, and characterizations of data related to the learner's responses and progress. Regardless, it is to be understood that the present invention contemplates that many different types of machine learning and artificial intelligence 190 may be employed within the scope thereof, and therefore, the one or more machine learning and artificial intelligence layers 190 may include one or more of such types of machine learning and artificial intelligence. These models may apply techniques that include, but are not limited to, k-nearest neighbor (KNN), logistic regression, support vector machines or networks (SVM), and one or more neural networks. Regardless, the use of machine learning and artificial intelligence in the present invention automatically and heuristically constructs appropriate relationships between data points, mathematically or otherwise, at least to normalize observations and convert them into revisions and adjustments of the auditory associations 120, textual associations 122, and visual associations 124, and any adjustments to the delivery of lesson material (including subliminal imprinting 140, constructive repetition 150, and stop-frame segmentation 160) to ensure that the training content 180 has been properly assimilated and retained by the learner 170.

The present invention may therefore also include an artificial intelligence module, configured for example to generate customized information for a learner 170 based on how he or she has perceived the material presented to that point. For example, the cognitive assimilation and situational recognition training tool 100 may be configured to speed up or slow down content generated for the learner 170, based on feedback it receives as material is being consumed. Such an artificial intelligence module may also be used as noted above to "suggest" the order in which to present rules and mechanics lessons to learners 170. The present invention may therefore "learn" how to create a more comprehensive building block approach that is customized for the specific learner 170.

Figure 2:
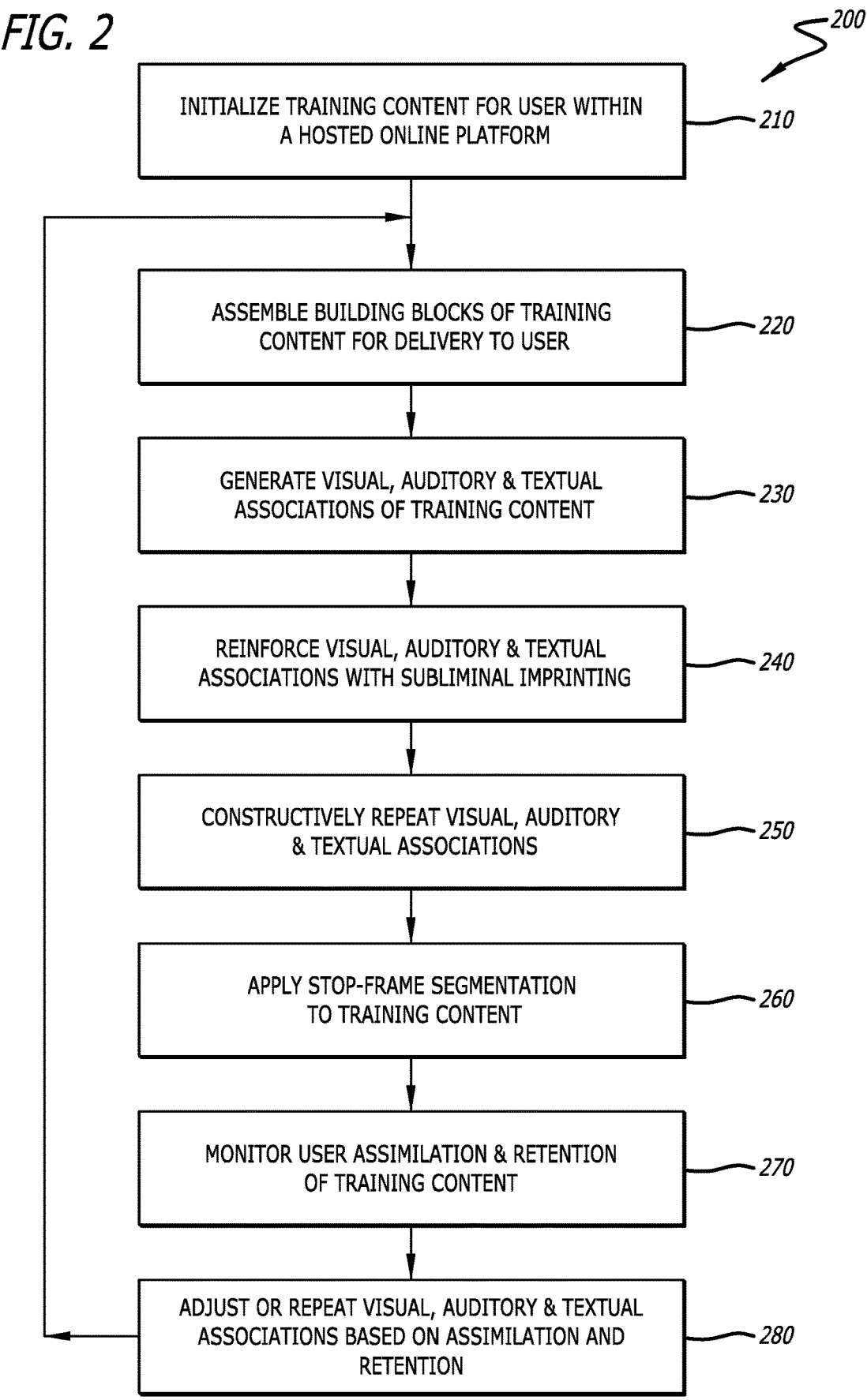
FIG. 2 is a flow chart of a process for performing cognitive assimilation and situational recognition of training content, according to the present invention.

FIG. 2 is a flow chart showing steps in a process 200 for performing cognitive assimilation and situational recognition of training content 180, according to the present invention. The process 200 begins by initializing, at step 210, training content 180 for a learner 170, within the hosted online platform over which lesson material and building blocks are delivered. These associations are with building blocks 130 of the training content 180, which are assembled at step 220.

At step 220, the process 200 generates the auditory associations 120, textual associations 122, and visual associations 124 of training content 180, and at step 230, begins reinforcing these associations with subliminal imprinting 140 as described further herein. At step 240, the process 200 determines whether the auditory associations 120, textual associations 122, and visual associations 124 need to be repeated for the learner 170, and how many times and in what context, for further retention of the training content 180. This may include, at step 250, applying techniques such as stop-frame segmentation of video data to slow down the delivery of training content 180 to ensure that the auditory associations 120, textual associations 122, and visual associations 124 are being fully assimilated and retained in the learner's memory. The process 200 includes monitoring learner 170 assimilation and retention of the training content 180 at step 260, and adjusting repeating the auditory associations 120, textual associations 122, and visual associations 124 based on the monitoring of the learner's ability to retain information.

Figure 3:
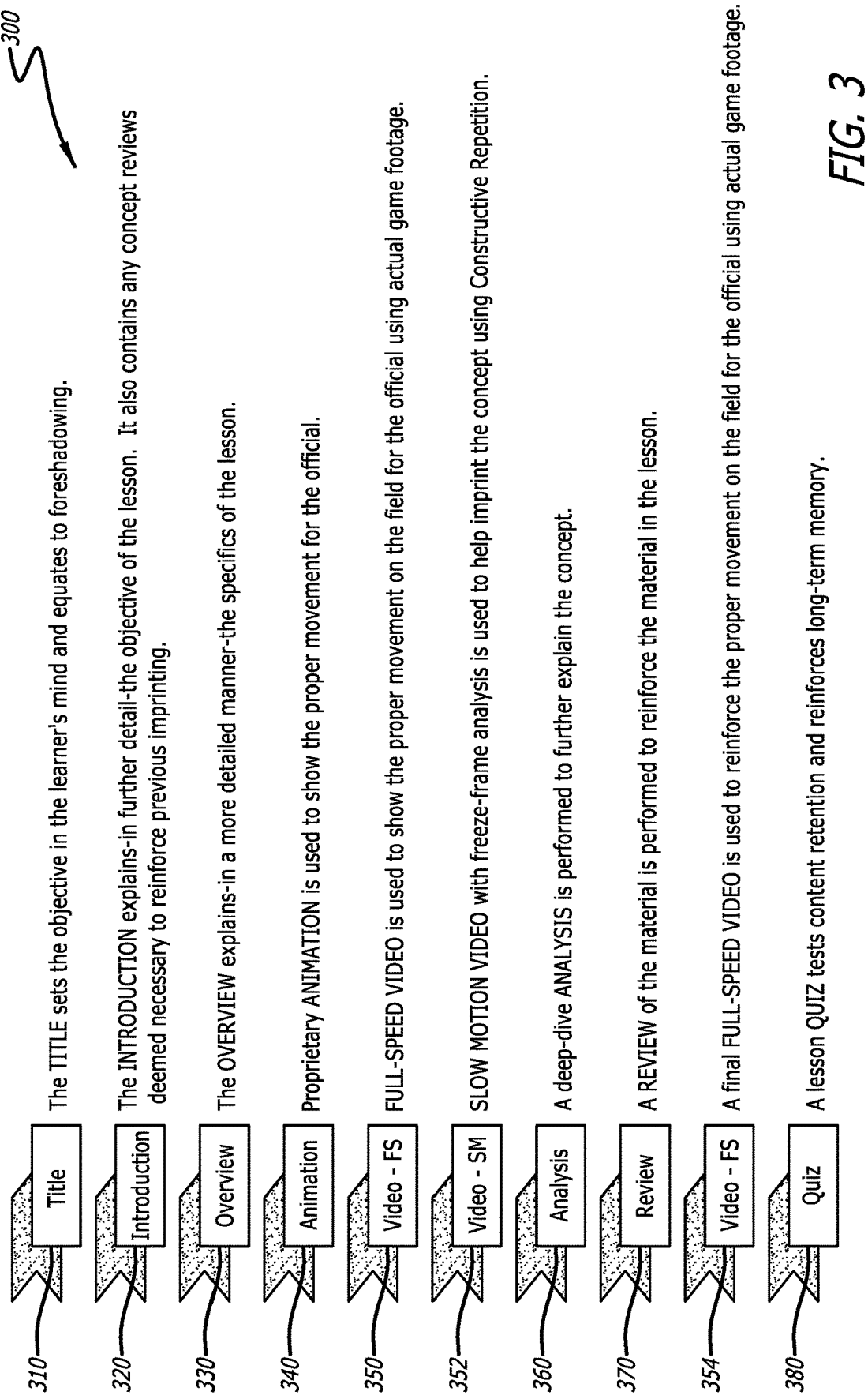
FIG. 3 is a diagram of building blocks in a tool and process for cognitive assimilation and situational recognition of training content, according to the present invention.

FIG. 3 is a diagram of information 300, provided in building blocks 130 of the training content 180, within the tool 100 and process 200 for cognitive assimilation and situational recognition. Information provided in a building block 130 may include a title 310, which begins the process of setting the objective of the block 130 in the learner's mind, and equates to future information to be delivered, in a foreshadowing of content. Information 300 may also include an introduction 320, which explains in further detail lesson or block's objective. The introduction 320 may also contain conceptual reviews that reinforce prior subliminal imprinting 140, such as in a previously-delivered block 130. Information 300 may further include an overview 330, which provides more detail to the learner 170 about the specifics about an upcoming lesson provided in a block 130.

The information 300 delivered to the learner 170 may include one or more animations 340, which for example demonstrate proper body movements for officials in the sporting context. Information 300 may also include full-speed video 350, which is applied to demonstrate proper movement using actual footage, for example of an official on a baseball field. Video information may be slowed down in slow motion video 352, which include a freeze-frame or stop-segment analysis to assist with imprinting the concept on the learner 170. This may be constructively repeated as necessary to ensure assimilation and retention.

The information 300 may then proceed with an analysis 360, which represents a deeper "dive" of the training content 180 to further explain the material to the learner 170. This analysis 360 may be customized depending on the learner's speed and retention of the material, based at least in part on modeling of the answers to quizzes and tests, and observations learned in the artificial intelligence layers 190. A review 370 is then provided to the learner 170 to reinforce the material delivered in a building block 130, and if necessary, additional full-speed video 354 is again shown to the learner 170 to further reinforce proper body movement using actual footage, for example of a referee officiating a game. Finally, a quiz or test 380 may be administered to the learner 170 to gauge content retention and reinforce long-term memory of the building block 130.

As noted above, the present invention may incorporate one or more mathematical modeling functions, and one or more artificial intelligence and machine learning layers 190 that apply these mathematical modeling functions and other analytical techniques, to determine whether the learner has sufficiently mastered the information 300 presented in a building block 130. These may be applied at any stage of consumption of training content 180 in a building block 130, and may adjust the visual, auditory, and textual associations based on the learner's progress as training content 180 is being delivered. The present invention may therefore attempt to characterize the learner's responses to building blocks 130 (and the auditory associations 120, textual associations 122, and visual associations 124), and observations developed from the learner's responses at any point in the process of delivering information 300, and may accumulate such characterizations and observations to further customize delivery of training content 180.

The present invention may further include one or more modules or components configured to generate output data on a graphical user interface, for example on a computing device on which the mobile application is used to consume material with the tool 100 for cognitive assimilation and situational recognition of training content 180. The mobile application may be configured to provide information via the graphical user interface, such as the number of lessons or modules that have been viewed, or results of testing. Output data may be in the form of training content 180 itself, and of the modalities described herein, or analytics regarding delivery of the training content 180 to the learner 170.

The tool 100 of the present invention may also enable one or more specific application programming interface (API) modules to provide particular information or services and generate specific outcomes, such as one or more specific advisory services. APIs may be tailored to provide specific services or information, such as generating a certification of completion of a particular learning level, or that a learner 170 has achieved a particular score if tested on material presented. It is to be understood that many types of services are possible within the present invention, and it is not to be limited to any one type of service mentioned herein.

The tool 100 of the present invention leverages the learner's mind's own internal mechanisms for visual cortex imprinting, as indicated in FIG. 1. The approach is provided in a system and method of learning method that includes modules for initializing and providing auditory association 120, textual association 122, visual association 124, subliminal imprinting 140, constructive repetition 150, stop-frame and slow-motion segmentation 160 of content, and testing, These components advance recognition, comprehension and retention for the learner 170 in a building block framework 130 where training content 180 is built on each previous subset of information 300 provided.

The tool 100 of the invention incorporates various types of input data, such as for example the training content 180 and various information 300 comprising building blocks 130 to be presented to the learner 170. This material may be provided as a steady stream of information 300, or in module-based sets or subsets of material, for examples as different lessons that are unlocked at various levels of the learning process. Regardless, the input data may be applied to a plurality of data processing modules within the computing environment 110, in which the systems and methods described herein are performed for additional processing, such as applying the one or more mathematical functions or models or other analytical techniques, that present the material to be learned in the components described herein.

The present invention may also include one or more database collections created for management of training content 180 and information 300 to be provided to the learner 170, including but not limited to a record of the auditory associations 120, textual associations 122, and visual associations 124, and the adjustments made thereto. This activity is managed with an administration component performed by one or more of the plurality of data processing modules. These one or more database collections may maintain information for the tool 100 in either online or offline storage environments.

A data visualization module of the tool 100 of the present invention uses visual associations 120 in the form of recorded situational footage (in the context of sports officiating, a particular play or situation in a game or contest), freeze-frame/stop-frame points-of-emphasis, and staged situations using full-speed video 350 and slow-motion video 352 (as well as stop-frame segmentation 160) to imprint images in the visual cortex of the brain of the learner 170. Material that is provided in this data visualization module may be repeated several times, and provided in conjunction with textual associations 122 and auditory associations 124. It is also coupled with subliminal imprinting techniques 140 and constructive repetition 150 of training content 180 to help the learner 170 to better retain the information presented.

As indicated in FIG. 1, various areas of the human brain work together in a multitude of ways in order to produce the images seen with the eyes and that are encoded by the brain. The basis of this work takes place in the visual cortex of the brain. The visual cortex is located in the brain's occipital lobe and harbors many other structures that aid in visual recognition, categorization, and learning. One of the first things the brain must do when acquiring new visual information is recognize the incoming material. Brain areas involved in recognition are the inferior temporal cortex, the superior parietal cortex, and the cerebellum. During tasks of recognition, there is increased activation in the left inferior temporal cortex and decreased activation in the right superior parietal cortex. Recognition is aided by neural plasticity, or the brain's ability to reshape itself based on new information. Next, the brain must categorize the material. The three main areas that are used when categorizing new visual information are the orbitofrontal cortex and two dorsolateral prefrontal regions which begin the process of sorting new information into groups and further assimilating that information into things that one might already know. After recognizing and categorizing new material entered into the visual field, the brain is ready to begin the encoding process—the process which leads to learning. Multiple brain areas are involved in this process such as the frontal lobe, the right extra-striate cortex, the neocortex, and again, the neostriatum. One particular area, the limbic-diencephalic region, is essential for transforming perceptions into memories. With the coming together of tasks of recognition, categorization and learning, schemas help make the process of encoding new information and relating it to things already known much easier. One can remember visual images much better when they can apply it to an already-known schema.

The tool 100 of the present invention incorporates visually "imprintable" excerpts of content in order to help the brain retain information presented. The visualization portion of the present invention accomplishes this using actual game footage, proprietary animation, textual overlay, auditory accompaniment, freeze-frame points-of-emphasis and stop-frame segmentation, and staged simulations using full speed and slow-motion video—to imprint the visual cortex of the brain with a "picture" of a particular situation or mechanical action. The visual material presented is especially designed to imprint a long-term memory of the situation and the associated mechanical action, so that when the situation occurs on the field, the official does not need to take time to analyze and recognize what happened. The memory is recalled and recognized quickly so that the official can associate with a particular call and/or action.

In particular, the visualization portion of the tool 100 applies the building block approach 130 to "assemble" a digestible set of fragments to construct a fully recognizable situation that the brain's hippocampus can retain. The tool 100, as indicated in FIG. 3, runs video segments in full-speed mode 350, which is then followed by a slow-motion 352 run-through with freeze-frame emphasis and stop-frame segmentation 160 to highlight critical points with text and audio associations overlaid, and then a complete run though of the material in a building block 130.

There is also, as shown in FIG. 3, animation 340 for each lesson that further contains textual associations 122 and auditory associations 124. The animation 340 shows the proper movement and timing for the official on the field. Music may also be utilized during some video and animation segments to open a different pathway in the brain to help with visual, auditory and textual assimilation for the learner 170. Each lesson has a review section 370 with further visual, textual, and auditory associations to quickly summarize what was the lesson was about, and then a final video segment 354 to remind the brain about the situation being discussed, as well as enabling one last imprint of the information into the hippocampus. Overall, this approach represents an imprint of the training content 180, and ensures that a long-term memory of the situation is implanted and retained in a sufficient manner so that it can be recalled quickly as the need arises in practice.

As noted above, to help build a long-term memory in the hippocampus in a learner 170 in a reduced period of time, one must simultaneously stimulate multiple sensory modalities. To visually show a situation that requires a decision of some type only stimulates the initial modality—the visual cortex. To compound this effect, one must also create 1) a repetitive method to help achieve the necessary number of cycles to properly imprint the brain; and, 2) an association to the event to further enhance the correlation of the preferred action required, with the visualization.

The present invention accomplishes this with sensory engagement using textual associations 122 and auditory associations 124 to properly construct the memory. Text is overlaid or singularly utilized, along with disfluency, to help "relate" the learner 170 to the situation demonstrated. Sensory engagement using auditory associations 124 is accomplished either via voiceover techniques or by incorporating music to open various synaptic pathways that lead to a deeper imprinting of the material presented. These approaches help to deepen the impact of the tool 100, and reduce the assimilation time for the learner 170 of the training content 180.

It is to be noted that images displayed to a learner 170 in the tool 100 may be video images, still images, and graphics, and visual associations 124 may additional include these types of images and any other type of image, in any type of file format. Additionally, auditory associations 120 may include voice-overs, music or spoken-word files, and any other method of conveying audio files and in any type of file format. Further, textual associations 124 may include textual overlays and other way of inserting or implementing files having texts in them, also in any type of file format. Further, it is to be understood that any combination of visual files, audio files, and text files may be applied in the tool 100.

The tool 100, as noted throughout, incorporates subliminal imprinting techniques 140 to imprint subliminal messages. These are a signal or message designed to pass below (sub) the normal limits of perception in the learner 170. For example it might be inaudible to the conscious mind (but audible to the unconscious or deeper mind) or might be an image transmitted briefly and unperceived consciously, and yet perceived unconsciously. These techniques 140 for incorporating subliminal sounds, words, or images allow messages to be perceived by deeper parts of what is a single integrated mind. In the everyday world, such subliminal techniques are used in advertising and for propaganda purposes (e.g. party political broadcasts). In the present invention, such techniques 140 are used to reinforce the material provided using the other modules in the online platform for the tool 100, such as the visualization module.

Subliminal perception, or cognition, is a subset of unconscious cognition where the forms of unconscious cognition also include attending to one signal in a noisy environment while unconsciously keeping track of other signals (e.g. one voice out of many in a crowded room) and tasks done automatically (e.g. driving a car). For example, bolded words that are in colorized text are subliminally "imprinted" in the mind by making them "stick out" as the underlying auditory voice-over reads, for example, the definition of a FOUL TIP for the learner 170. This helps to imprint the key points in the learner's memory using visual associations 120, textual associations 122, auditory associations 124, and constructive repetition 150 of training content 180 in building blocks 130.

Many types of subliminal imprinting exist, and it is to be understood that subliminal imprinting may take many forms in the present invention. For example, standard-speed, regular audio messages may be inserted as auditory associations 120, but executed at a frequency that is above the limit of human hearing. Also, messages may be digitally altered to play in reverse, at standard speed, or faster or slower than regular speed, so that mind still is able decode this information without the learner realizing that a message has been delivered. Multiple messages (comprising auditory, visual, or textual associations) may also be inserted together at the same time during a lesson. Although the learner will not consciously understand the information, the brain is still able to decipher it. Additionally, one type of association may be blended into another seamlessly, so that a distinction between messages comprising each association may not be perceptible by the user. For example, textual messages may be blended into auditory or visual messages, so that a message is played at an audible level, and is masked and blended behind a regular voiceover, or morphs in a visual representation of an audio or textual explanation of a concept.

In order to successfully build a model in the "mind's eye", a sufficient amount of repetition is required to implant the training content 180 so that lesson material can be recalled as needed. Typically it is said that one must see something seven times to remember it. This is known as the "Rule of Seven" and is often used in marketing. Constructive repetition 150 in the present invention applies this concept using a slightly different approach. If one thinks of building a house, one must have a foundation, walls and a roof to complete the construction. Constructive repetition 150 in the tool 100 takes multiple formats of message delivery—visualization such as for example video footage, freeze-frame points-of-emphasis and subliminal imprinting, together with visual association 120, textual association 122, and auditory association 124 and compounds them in an almost simultaneous delivery to deepen the assimilation of the training content 180 by the learner 170 in a delivery approach utilizing building blocks 130. In other words, the present invention "constructs" a memory for the visual cortex by building a model of the training content 180 for the mind to absorb more rapidly than with any one medium by itself.

The present invention contemplates that at no time are there less than two delivery mediums being leveraged in the lesson material in the training content 180, and in some cases, there are three to five. This helps the sports official relate what he sees to the game and build a model of each lesson in the long-term memory of the brain for the learner 170.

In the world of sports officiating, there are numerous fundamental situations that can occur that might take years to master and hundreds, if not thousands, of actual games to actually observe on the field. If a particular situation has never been experienced by the official, a significant amount of time is taken to process the visual information and correlate it to visual, textual and auditory information from the past. If the past information was not absorbed, then there is no correlation between the situational event and the necessary action to take. If the past information was absorbed but is not in the "active" part of the memory, then it can take a significant amount of time to process. By then, the play is over and the delay due to a lack of certainty impacts the ability of the official to properly rationalize what is occurring since using brain cycles to perform a "visual-to-text" comparison algorithm requires a significant amount of processing power, thus increasing the probability of an incorrect call or ruling. Even worse, it can result in no call being made, which many times results in an ensuing argument.

Having the brain perform a "visual-to-visual" relational analysis is exponentially faster since the same part of the brain is utilized (e.g. the visual cortex) and memories are correlated as quickly as smells are (i.e. smoke, chlorine, etc.). Visual images are imprinted much deeper than text or auditory information in and of itself. Any time the brain is required to cross-correlate (i.e. convert text into an image and then compare what you see to what you think the text means), there is a significant inefficiency factor that is exponentially slower than when keeping all analysis in the same part of the brain and within sensory alignment.

The tool 100 also performs the "text to visual" association when it implants the memory of the situation, so the translation in the brain occurs much faster as compared to students that used a text-only approach to learning sports officiating.

The tool 100 for promoting cognitive assimilation and situational recognition of training content 180 uses stop-frame segmentation 160, incorporating freeze-frame of points-of-emphasis to lengthen the time that a particular video concept is absorbed by the visual cortex of the learner's brain. Magnification, pointers, lines and textual overlay may be used in conjunction with each other to focus the learner 170 and implant a key learning point, while giving the learner's brain extra time to absorb that particular concept. This subliminally stresses the importance of that segment to the brain, and it retains this with a greater recall priority for the physical muscle memory building portion of the sports official's holistic learning process.

Stop-frame segmentation 160 may be implemented at any point during delivery of information 300 in a building block 130, and may last for any length of time. For example, the tool 100 may determine, based at least in part on its observations of a learner's content retention, that visual frame should be stopped for x number of seconds. The value of x may therefore change based on the learner's test answers (for example), or any other metric for determining whether training content 180 has been assimilated. Similarly, material overlaid or utilized in conjunction with this stop-frame segmentation 160 may also change, as well as the time period over which is displayed or applied, also depending at least in part on its observations of a learner's content retention (such as the learner's testing results.

There are two facets to the building block aspect 130 of the tool 100 of the present invention, and to and how it is applied, for example for training of sports officials. First, a logical set of methods is built throughout each lesson to better imprint the training content 180 in the mind of the learner 170. It begins with a lesson overview, and then the dissection of the material piece-by-piece occurs, concluding with its reassembly. The tool 100 of the present invention also correlates variants for each situation to help the learner 170 see their impact to a given situation. Second, the tool 100 of the present invention takes related topics from within the sport and assembles them into a lesson to ensure all corresponding components are assembled and taught at the same time. For example, in the game of baseball there is the written rule for a FOUL TIP for which an auditory overly or dub could be applied, coupled with font bolding and coloring, in a visual association 120, to help subliminally imprint the information into the visual cortex of the learner 170. In addition, video footage showing what is and what is not a FOUL TIP is included in the lesson, along with the mechanics for signaling a FOUL TIP. Any related rule references in the rule book are seen, heard and visualized in the lesson to ensure the learner 170 has the complete rule or mechanic construct and its associated interpretation(s) in one sitting.

The present invention may also "suggest" the order in which to take the rules and mechanics lessons to help create a more comprehensive building block approach 130 when it comes to the ingest of the content itself. While the learner 170 can take the courses and lessons in any order they so choose, leveraging a suggested order provides lessons that build on each other in a logical fashion as it pertains to the field of learning. This eliminates the disjointed manner in which many of these fundamentals are currently taught.

More skilled officials may utilize courses, lessons, and building blocks 130 in any order they choose to help reinforce and/or implant the information 300 and training content 180 in a more consistent fashion. In other words, a more skilled official will develop better retention and recall by taking the course material, irrespective of the order of lessons or courses.

In the process of absorbing and retaining information, a process known as encoding is the first step to creating a new memory. It allows the perceived item of interest to be converted into a construct that can be stored within the brain, and then recalled later from short-term or long-term memory. Encoding is a biological event beginning with perception through the senses. The process of laying down a memory begins with attention (regulated by the thalamus and the frontal lobe), in which a memorable event causes neurons in the learner's brain to "fire" more frequently, making the experience more intense and increasing the likelihood that the event is encoded as a memory.

As suggested in FIG. 1, multi-sensory inputs are decoded in the various sensory areas of the frontal and temporal lobes and motor cortex of the human brain, and then combined in the brain's hippocampus and cerebellum into one single experience. The hippocampus is then responsible for analyzing these inputs and ultimately deciding if they will be committed to long-term memory. It acts as a kind of sorting center where the new sensations are compared and associated with previously recorded ones. The various threads of information are then stored in various different parts of the brain, although the exact way in which these pieces are identified and recalled later remains largely unknown.

The key role that the hippocampus plays in memory encoding has been highlighted by examples of individuals who have had their hippocampus damaged or removed and can no longer create new memories. It is also one of the few areas of the brain where completely new neurons can grow. The present invention, as noted herein, employs its various techniques in the tool 100 to ensure that material is encoded into the learner's memory, and then reinforced with subliminal imprinting 140, constructive repletion 150, stop-frame segmentation 160, and other functions.

As noted above, the tool 100 for cognitive assimilation and situational recognition of training content 180 of the present invention is presented across an online content delivery platform that is customized to present an experience that aids in the long-term retention of the learning content and flows with normal human patterns of reading and content assimilation. This underlying content delivery system occurs using a portal that enables the training content 180 to be streamlined by organizing it into a hierarchy that is relatable to the learner 170, and dramatically improves the learner's experience throughout the lesson and building block 130 delivery process.

In one embodiment, courses are laid out in the content delivery system in a logical order that enhances the learner's optimal learning experience, for example from left to right (which is the direction that the learners typically read content (e.g. in most languages western languages). Lessons are laid out in a stack-ranked order from top to bottom, which is also a natural order for the typical learner 170. This makes the flow of the courses and lessons occur in a "natural" order that is intuitive and easy to follow. Additionally, the order is customizable, so that it can accommodate other language flows (right to left, or top to bottom) if adopted.

A naturally-feeling workflow, coupled with a simply organized hierarchy, helps to put the learner 170 at ease, since there is minimal effort to find the content. Many learning management systems do not logically organize related material, and it can be frustrating for the learner to find what they want using those existing system. The present invention, in contrast, uses simplicity as a concept throughout—from the portal used for content delivery, to the way the content is organized and the lessons are constructed. Keeping things simple relaxes the learning and improves their experience, which positively impacts their learning retention.

Each lesson may be configured with a minimal amount of "readable" content on the page, and this may depend on the learner 170, for example for those that ingest reading material better than others. The lessons typically contain a quick overview of the content at the top of the page, and then a graphic showing the video content title and branding may be linked to actual training videos. The tool 100 also incorporates an advanced learning methodology that includes testing, as noted above, so that after each lesson the learner must pass a multi-question quiz, exam or test that can be completed quickly. The system does offer complex and comprehensive cumulative content exams for the advanced learner, and also allows for a certification process with watermarked exam certificates, for example when an exam has been passed with satisfaction. As noted above, the results of these quizzes, exams, and tests, and the time it takes to complete them, may be monitored so that repeated building block 130 material (including visual associations 120, textual associations 122, auditory associations 124 subliminal imprinting 140, and stop-frame segmentation 160) can be properly adjusted for the learner's ability.

The systems and methods of the present invention may be implemented in many different computing environments. For example, the tool 100 for the cognitive assimilation and situational recognition training system of the present invention may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, the Cognitive Assimilation and Situational Recognition Training System approach may be applied to any situational training and content where such techniques would be beneficial, and to any field. Many examples are possible, and include law enforcement, military, or security training, flight training for pilots or air crew, and training for medical professionals such as emergency/first responders. It is therefore intended that the scope of the invention is not to be limited by any one aspect of this detailed description, or to any one field, profession, or situation.

Additionally, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method for cognitive assimilation and situational recognition training, comprising:

within a computing environment comprised of at least one computer processor, and at least one non-transitory computer-readable storage medium operably coupled to the at least one computer processor, the at least one computer processor operable to execute a plurality of program instructions to deliver a plurality of visual, auditory, and textual associations to training content for a learner within a hosted platform, by performing the steps of:

assembling the training content for distribution to the learner in a plurality of building blocks of lesson material, and applying one or more subliminal imprinting techniques to reinforce the visual, auditory, and textual associations to the training content on the learner by inserting one or more messages comprised of sounds, words, or images within the visual, auditory, and textual associations into the lesson material;

constructively repeating the visual, auditory, and textual associations of the training content for the learner;

assessing an assimilation and retention of the lesson material by the learner based on observations taken from one or more user interactions with the lesson material to automatically determine a length of time for each of a frame length and a time between display of frames in a variable-length stop-frame segmentation of the lesson material, and automatically adjust the sounds, words, or images of the one or more messages inserted into the lesson material; and displaying a structured assembly of the plurality of building blocks comprising the lesson material and the one or more messages comprised of the visual, auditory, and textual associations inserted into the lesson material forming the training content to the learner, so that a display of the lesson material and the one or more messages comprised of the visual, auditory, and textual associations inserted into the lesson material starts and stops at varying times based on the learner's assimilation and retention of the lesson material according to the variable-length stop-frame segmentation of the structured assembly determined for the learner, for long-term assimilation and retention of the training content by the learner, so that previously-learned material is additionally reinforced in subsequent introductions of additional material in the training content.

2. The method of claim 1, wherein the training content includes one or more of a plurality of images, textual overlays, music, audio, and voiceovers.

3. The method of claim 2, wherein the plurality of images include video, still images, and graphics.

4. The method of claim 2, wherein the plurality of images, textual overlays, music, audio, and voiceovers are delivered to the learner in a plurality of file formats.

5. The method of claim 1, further comprising monitoring the assimilation and retention of the training content by the learner from observations taken from the one or more user interactions, by generating at least one test for the user in at least one instance of a building block in the plurality of building blocks.

6. The method of claim 5, further comprising adjusting the visual, auditory, and textual associations based on the assimilation and retention of the training content by the learner, and automatically adjusting the length of time for each of the frame length and the time between display of frames in the variable-length stop-frame segmentation of the training content for insertion of the one or more messages.

7. The method of claim 1, further comprising one or more layers of artificial intelligence to model the observations taken from the one or more user interactions and developed from learner responses to the at least one test to adjust one or more of the visual, auditory, and textual associations and the variable-length stop-frame segmentation.

8. The method of claim 1, further comprising presenting the training content on a online hosting platform.

9. A cognitive assimilation and situational recognition training system, comprising:
   a custom learning management tool within a computing environment comprised of at least one computer processor, and at least one non-transitory computer-readable storage medium operably coupled to the at least one computer processor, the at least one computer processor operable to execute a plurality of data processing modules that apply a building block approach for training content provided to a learner, the plurality of data processing modules including:
   a training content visualization module configured to provide a plurality of images of training content to the learner;
   a correlation module configured to correlate one or more of visual, auditory and textual associations in a plurality of building blocks of lesson material with the plurality of images to create visualized training content for the learner;
   a training content imprinting and reinforcement module configured to 1) apply one or more subliminal imprinting techniques to enhance the lesson material and reinforce the visualized training content on the learner by inserting one or more messages comprised of sounds, words, or images within the visual, auditory, and textual associations into the lesson material, and 2) repeat the visual, auditory, and textual associations of the training content for the learner;
   a content adjustment module configured to assess an assimilation and retention of the lesson material by the learner based on observations taken from one or more user interactions with the lesson material to automatically determine a length of time for each of a frame length and a time between display of frames in a variable-length stop-frame segmentation of the lesson material, and automatically adjust the sounds, words, or images of the one or more messages inserted into the lesson material, so that a display of a structured assembly of the plurality of building blocks comprising the lesson material and the one or more messages comprised of the visual, auditory, and textual associations inserted into the lesson material starts and stops at varying times based on the learner's assimilation and retention of the lesson material according to the variable-length stop-frame segmentation of the structured assembly determined for the learner, and so that previously-learned material is additionally reinforced in subsequent introductions of additional material in the training content, and adjust the visual, auditory, and textual associations of the training content for the learner; and
   a hosting platform for displaying the training content to the learner, and enabling the learner to access the custom learning management tool.

10. The system of claim 9, wherein the one or more of visual, auditory and textual associations includes the plurality of images, textual overlays, music, audio, and voiceovers.

11. The system of claim 10, wherein the plurality of images include video, still images, and graphics.

12. The system of claim 10, wherein the plurality of images, textual overlays, music, audio, and voiceovers are delivered to the learner in a plurality of file formats.

13. The system of claim 9, further comprising a testing module configured to deliver at least one exam to the learner to test assimilation and retention of the training content.

14. The system of claim 13, wherein the content adjustment module is configured to monitor assimilation and retention of the training content from the observations taken from the one or more user interactions and the at least one exam, and adjust one or more of the visual, auditory, and textual associations and adjust the length of time for each of the frame length and the time between display of frames in the variable-length stop-frame segmentation of the training content for insertion of the one or more messages in response to the learner's response to the at least one exam.

15. The system of claim 13, further comprising one or more layers of artificial intelligence configured to model the observations taken from the one or more user interactions and developed from learner responses to the at least one exam, and adjust one or more of the visual, auditory, and textual associations and the variable-length stop-frame segmentation based on the observations developed from the learner responses.

* * * * *